(12) United States Patent
Song

(10) Patent No.: US 9,764,824 B2
(45) Date of Patent: Sep. 19, 2017

(54) THERMAL ACTUATION OF RIBLETS

(71) Applicant: The Boeing Company, Chicago, IL (US)

(72) Inventor: Weidong Song, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 14/858,600

(22) Filed: Sep. 18, 2015

(65) Prior Publication Data

US 2017/0081021 A1     Mar. 23, 2017

(51) Int. Cl.
| | | |
|---|---|---|
| *B64C 1/38* | (2006.01) | |
| *B64C 21/10* | (2006.01) | |
| *B64C 23/00* | (2006.01) | |
| *F15D 1/00* | (2006.01) | |
| *B64C 3/14* | (2006.01) | |

(52) U.S. Cl.
CPC ............ *B64C 21/10* (2013.01); *B64C 23/005* (2013.01); *F15D 1/004* (2013.01); *B64C 2003/148* (2013.01); *B64C 2230/10* (2013.01); *B64C 2230/26* (2013.01)

(58) Field of Classification Search
CPC ....... B64C 2230/26; B64C 23/06; F15D 1/12; F15D 1/004; F15D 1/0035; F15D 1/006; F15D 1/007
See application file for complete search history.

(56) References Cited

U.S. PATENT DOCUMENTS

| | | | | |
|---|---|---|---|---|
| 8,074,938 B2 * | 12/2011 | Hyde | ...................... | B64C 21/10 244/130 |
| 2010/0018322 A1 * | 1/2010 | Neitzke | ..................... | F15D 1/12 73/861.22 |
| 2010/0187361 A1 * | 7/2010 | Rawlings | .................. | B32B 3/08 244/130 |
| 2011/0186685 A1 * | 8/2011 | Tsotsis | .................... | B64C 21/10 244/130 |
| 2013/0255796 A1 * | 10/2013 | Dimascio | .................. | F16S 5/00 137/334 |
| 2014/0186180 A1 | 7/2014 | Neitzke et al. | | |

OTHER PUBLICATIONS

Koshi Takenaka, "Negative thermal expansion materials: technological key for control of thermal expansion," published Feb. 2, 2012, Science and Technology of Advanced Materials, vol. 13, 12 pages.

(Continued)

*Primary Examiner* — Richard G Davis
(74) *Attorney, Agent, or Firm* — Hanley, Flight & Zimmerman, LLC

(57) ABSTRACT

Thermal actuation of riblets is described herein. One disclosed example apparatus includes a riblet defining an aerodynamic surface of a vehicle. The disclosed example apparatus also includes a thermal expansion element within or operatively coupled to the riblet, wherein the thermal expansion element changes shape in response to a surrounding temperature, to displace a movable portion of the riblet relative to the aerodynamic surface to alter an aerodynamic characteristic of the vehicle.

18 Claims, 7 Drawing Sheets

(56) References Cited

OTHER PUBLICATIONS

3M, "3M Solar Energy," 2015, [http://solutions.3m.com/wps/portal/3M/en_US/Renewable/Energy], retrieved on Sep. 16, 2015, 1 page.
3M, "3M Reveals Successful Collaboration with BMW ORACLE Racing for 33rd America's Cup Match," published on Feb. 24, 2010, [http://news.3m.com/press-release/company/3m-reveals-successful-collaboration-bmw-oracle-racing-33rd-americas-cup-match], retrieved on Sep. 16, 2015, 2 pages.
NASA, "NASA Riblets for Stars & Stripes," published Oct. 1993, [http://www.nasa.gov/centers/langley/news/factsheets/Riblets_prt.htm], retrieved on Sep. 16, 2015, 2 pages.
Agrim Sareen, "Drag Reduction Using Riblet Film Applied to Airfoils for Wind Turbines," Thesis for Degree of Master of Science in Aerospace Engineering in the Graduate College of the University of Illinois at Urbana-Champaign, May 22, 2012, 258 pages.
St. Anthony Falls Laboratory, "Featured Research Project: Reducing Wind Turbine Blade Drag Using Riblet Film," 2012, [http://www.safl.umn.edu/featured-story/featured-research-project-reducing-wind-turbine-blade-drag-using-riblet-film], retrieved on Sep. 16, 2015, 3 pages.
Brian Douglas Dean, "The Effect of Shark Skin Inspired Riblet Geometries on Drag in Rectangular Duct Flow," Thesis for Degree of Master of Science in the Graduate School of the Ohio State University, 2011, 86 pages.
KISS Polymers, "KISS Complete's Mechanisms of Drag-Reduction," [http://www.kisspolymers.com/Science/dragreduction.htm], retrieved on Sep. 16, 2015, 1 page.
Jessy Lin, "Drag Reduction with Riblet Film," published on Jan. 8, 2013, [https://prezi.com/1kixl75xfh8g/drag-reduction-with-riblet-film/], retrieved on Sep. 16, 2015, 2 pages.
Han et al., "Fabrication of a Micro-Riblet Film and Drag Reduction Effects on Curved Objects," IEEE, The 12th International Conference on Solid State Sensors, Actuators and Microsystems, Jun. 6-12, 2003, 4 pages.
Michael Banks, "Cooled material stretches beyond belief," Physics World, Feb. 7, 2008, [http://physicsworld.com/cws/article/news/2008/feb/07/cooled-material-stretches-beyond-belief], retrieved on Sep. 18, 2015, 2 pages.
Transwiki, "Expands on freezing," Nov. 4, 2013, [https://wiki.xtronics.com/index.php/Expands_on_freezing], retrieved on Sep. 18, 2015, 2 pages.
Wikipedia, "Negative thermal expansion," Sep. 6, 2015, [https://en.wikipedia.org/wiki/Negative_thermal_expansion], retrieved on Sep. 18, 2015, 3 pages.
European Patent Office, "Extended European Search Report", issued in connection with European Application No. 16188912.6, dated Mar. 1, 2017 (8 pages).
Grigoriadis et al., "Negative Thermal Expansion in Discotic Liquid Crystals of Nanographenes," Wiley InterScience, Advanced Materials, 2010, vol. 22, pp. 1403-1406, 4 pages.

\* cited by examiner

THERMAL ACTUATION OF RIBLETS

FIELD OF THE DISCLOSURE

This patent relates generally to riblets and, more particularly, to thermal actuation of riblets.

BACKGROUND

Microstructures are typically used on an aircraft to alter flight characteristics and/or dynamics of the aircraft. In particular, microstructures such as riblets are used on surfaces of an aircraft wing, a fin or a fuselage of an aircraft to reduce drag and/or a drag coefficient of the aircraft, which can result in overall fuel savings and/or reduction in carbon-dioxide emissions, etc. However, these riblets and other microstructures can also have fragile microscopic features that can be damaged and/or attract foreign particles (e.g., dirt particles) that may fill these microscopic features, thereby negatively affecting overall aerodynamic aircraft efficiency. As a result, associated repair and/or maintenance costs may be required to maintain the aircraft within operating parameters.

SUMMARY

An example apparatus includes a riblet defining an aerodynamic surface of a vehicle. The example apparatus also includes a thermal expansion element within or operatively coupled to the riblet, wherein the thermal expansion element changes shape in response to a surrounding temperature, to displace a movable portion of the riblet relative to the aerodynamic surface to alter an aerodynamic characteristic of the vehicle.

Another example apparatus includes a thermal expansion element embedded within or proximate a riblet structure, wherein the thermal expansion element is to define an aerodynamic surface of a vehicle, where the thermal expansion element expands, based on a surrounding temperature, to cause one or more of a movable portion of the riblet structure or the thermal expansion element to expand and displace away from an aerodynamic surface of the vehicle to alter an aerodynamic characteristic of the vehicle.

An example method includes using a thermal expansion element within or proximate a riblet structure, and allowing the thermal expansion element to displace at least a portion of the riblet structure relative to an aerodynamic surface to alter an aerodynamic characteristic of a vehicle.

Figure 1:
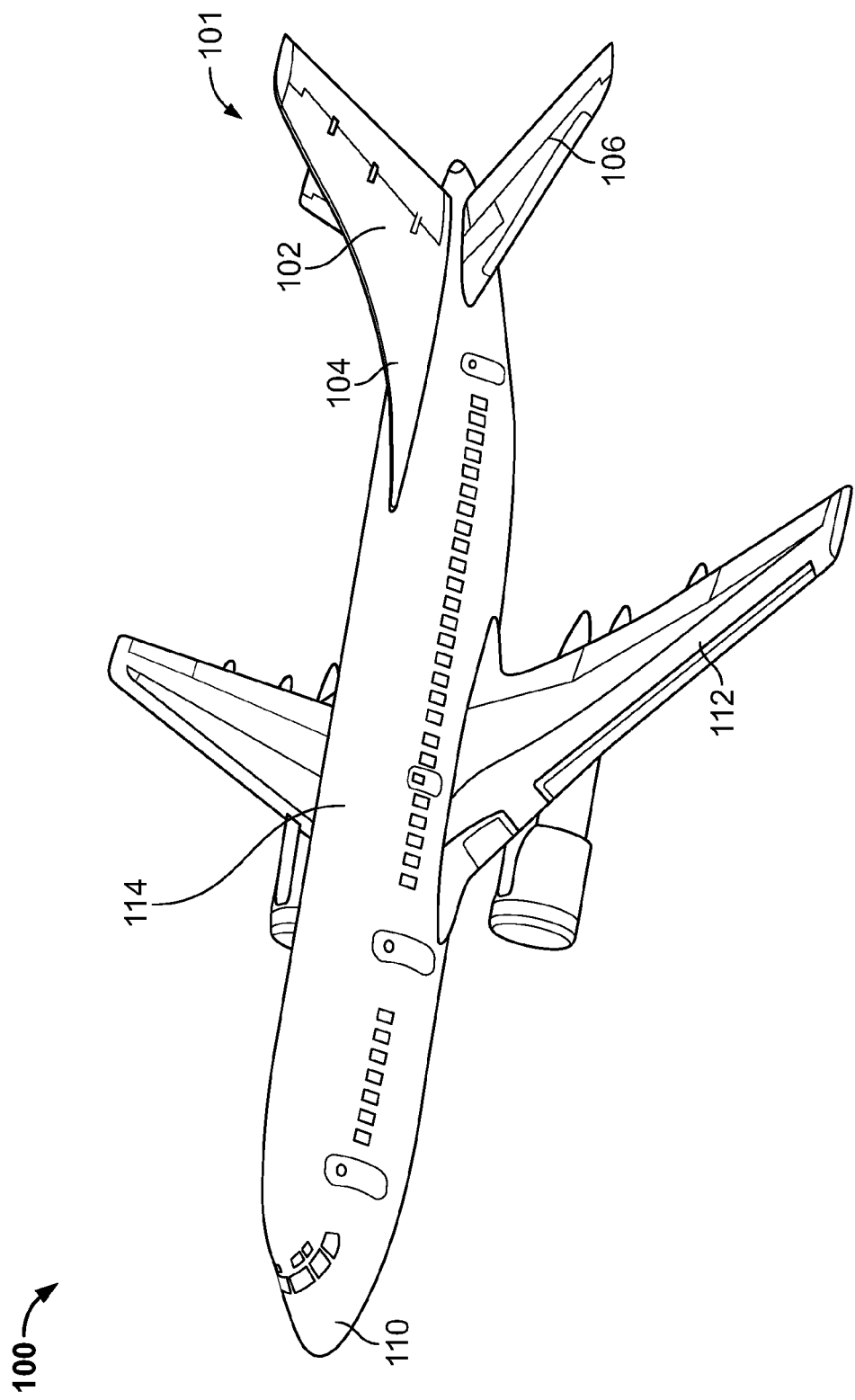
FIG. 1 illustrates an example aircraft that may be used to implement the example methods and apparatus disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Thermal actuation of riblets is disclosed herein. Microstructures such as riblets, for example, are typically used on aerodynamic surfaces of an aircraft to alter and/or improve flight characteristics to reduce an overall drag of the aircraft, for example, and, thus, may result in in overall fuel savings and/or reduction in carbon-dioxide emissions, etc. However, these riblets and other aerodynamic microstructures can also be damaged and/or foreign particles (e.g., dirt particles) may be attracted and/or fill microscopic features of the riblets, thereby resulting in reduced aircraft efficiency. The exposure of the riblets to damage and/or foreign particles may often result in associated repair and/or maintenance costs.

The examples disclosed herein utilize thermal expansion elements to alter physical dimensions of aerodynamic structures (e.g., microstructures) such as riblets on aerodynamic surfaces of vehicles (e.g., aircraft, vehicles, spacecraft, etc.). In particular, the thermal expansion elements are actuated (e.g., displaced, moved relative to an aerodynamic surface, etc.) to a certain degree (e.g., an amount of displacement) at certain temperature ranges. For example, the thermal expansion elements may expand/displace to a predicted degree based on operating temperature(s) experienced by the thermal expansion elements.

The examples disclosed herein allow riblets to avoid damage and/or trapped dirt/particles in the riblets by actuating at least a portion of the riblets and/or riblet structures to have a reduced height from external aerodynamic surfaces and/or to be positioned beneath external aerodynamic surfaces at certain surrounding temperatures and/or certain external conditions. In particular, allowing the portion of the riblets to extend past an external aerodynamic surface alters a flight characteristic of an aircraft such as drag coefficient, for example. In particular, a ridge (e.g., peak, a wedge, etc.) of an aircraft riblet may sit beneath an external aerodynamic surface and the ridge may be composed of a negative thermal expansion material, for example, that changes shape (e.g., expands) as it is cooled. In particular, the ridge may extend past and/or away from the aerodynamic surface to alter an aerodynamic characteristic of an aircraft (e.g., reduce a drag coefficient of an aircraft, etc.) as the aircraft moves into surrounding areas with different temperatures (e.g., cooler temperatures associated with cruise altitudes, etc.). The examples disclosed herein allow/enable use of expansion materials that may significantly expand at temperatures of approximately −50° Celsius (C), for example. The examples disclosed herein allow control of aerodynamic properties based on surrounding temperatures, for example, that correspond to different flight conditions/modes. In other words, aerodynamic properties of an aircraft may be adjusted based on expected surrounding temperatures associated with different flight modes. The examples disclosed therefore enable shape alteration/actuation of aircraft aerodynamic microstructures, for example, without complex and/or expensive mechanical actuation devices such as electric actuators and/or gearing.

As used herein, the terms "riblet structure" or "riblet" refers to geometric features, portions, ridges, valleys, patterns of ridges and valleys, dimensions, films (e.g., extruded films) and/or distances of riblets/riblet structures (e.g., periodic distances, heights and/or widths, etc.) that may have sizes of approximately 10-200 microns, but typically 75-125 microns. As used herein, the term "negative thermal expansion material" refers to material that contracts upon the application of heat and, conversely, expands as heat is removed and may encompass any material, solid and/or liquid that expands as it is cooled (e.g., significantly expands as the material is cooled within certain temperature ranges). As used herein, the term "thermal actuation" refers to displacement of components/portions of an aerodynamic structure/surface, for example, based on a temperature (e.g., a surrounding temperature, an operating temperature and/or temperature of the components). As used herein, the phrase "expansion properties" refers to a property of a material, which may be in any state (liquid, solid, etc.), to expand or contract based on temperature.

FIG. 1 illustrates an example aircraft 100 in which the examples disclosed herein may be implemented. The aircraft 100 of the illustrated example includes a tail section 101 including a vertical fin 102 adjacent to a dorsal fairing 104, horizontal stabilizers 106, a nose section (e.g., a cockpit section) 110 and wings 112 attached to a fuselage 114. The examples described herein may be applied to surfaces and/or features (e.g., riblets) of any of the tail section 101, the nose section 110, the stabilizers 106, the wings 112 and/or the fuselage 114, or any other exterior or outboard structure (e.g., a wing strut, an engine strut, a canard stabilizer, etc.) and/or surface capable of affecting the aerodynamic properties of the example aircraft 100.

Figure 2:
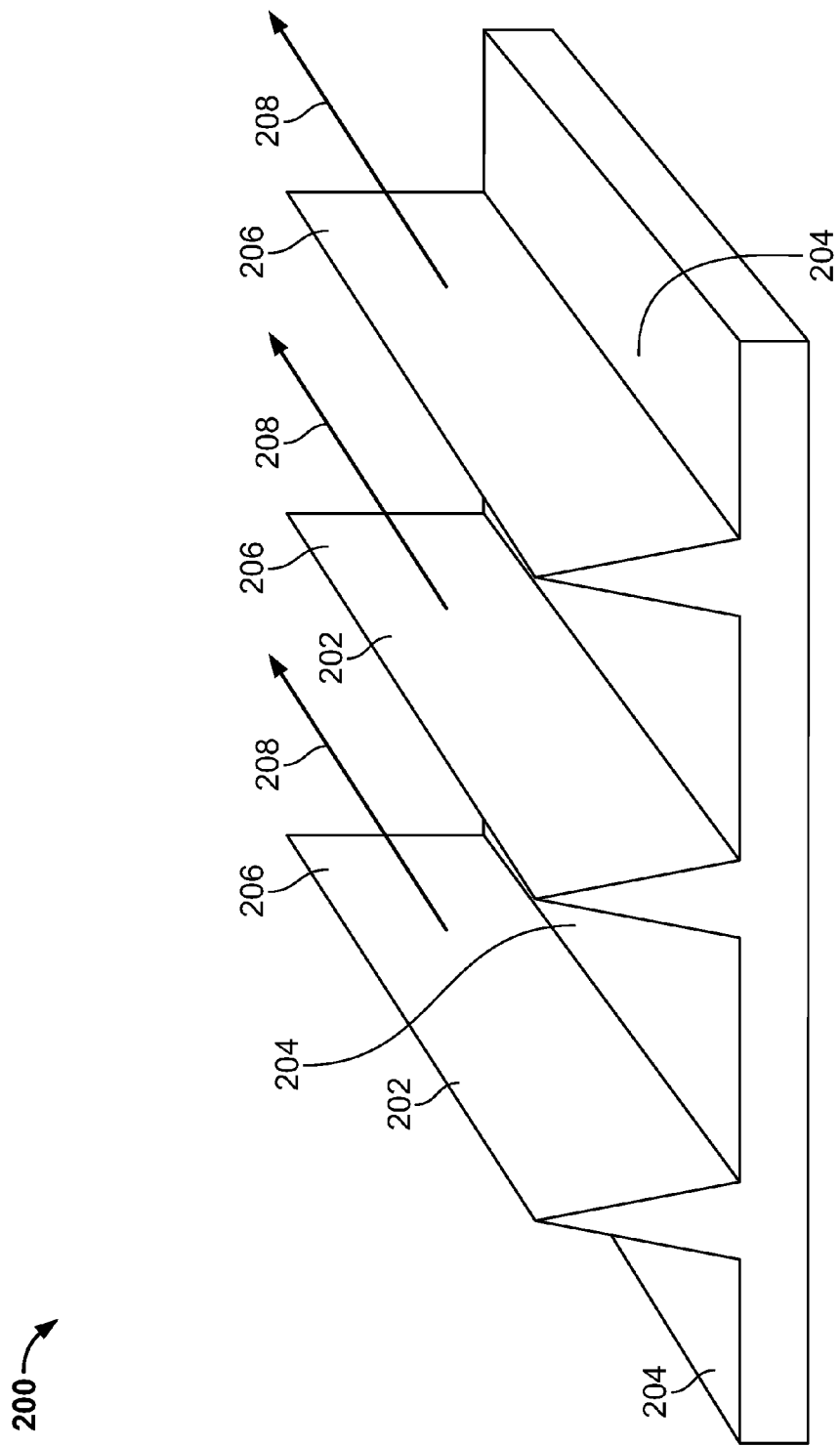
FIG. 2 is an example riblet microstructure from an external surface of the example aircraft of FIG. 1 on which the examples disclosed herein may be implemented.

FIG. 2 is an example riblet (e.g., a riblet microstructure) 200 that forms part of and/or defines an external surface of the example aircraft 100 of FIG. 1 on which the examples disclosed herein may be implemented. The riblet 200 of the illustrated example includes ridges (e.g., protrusions, peaks, wedges, etc.) 202, which are spaced apart (e.g., equidistant) from one another, and base surfaces (e.g., aerodynamic surfaces, valleys, aircraft surfaces, etc.) 204 that space the ridges 202 apart from one another. In this example, the profiles of the ridges 202 are generally triangular, thereby defining ridges having generally triangular cross-sections. A profile of the riblet 200 is extruded to define the riblet 200 (e.g., a defined volume of the riblet 200). While the example riblet 200 is extruded in this example, the example riblet 200 may be formed by embossing, casting, pressing, thermoforming, machining, etc. Additionally or alternatively, the base surfaces 204 may have ridges that are smaller than the ridges 202 (e.g., less than a third of the height of the ridges 202).

In this example, the riblet 200 is a riblet of the aircraft 100 and is used to alter the aerodynamic characteristics of the aircraft 100 by reducing an overall drag of the aircraft 100, for example, and may be located on any outboard or external surface and/or define a portion of the aircraft 100. The riblet 200 of the illustrated example is used to reduce aerodynamic drag by controlling turbulent boundary layers and/or preventing cross-flows associated with a turbulent boundary layer in air near an external surface of the aircraft 100. In particular, the example riblet 200 may be installed on the external surface of the aircraft 100 to align the ridges 202 such that flow guiding surfaces 206, which are defined along a length of the ridges 202, are aligned with a desired direction of airflow, as generally indicated by arrows 208. This alignment allows the ridges 202 to act as small fences or guides that disrupt and reduce lateral airflow motions near the external surface to enhance in-line turbulent airflow and reduce skin friction of the external surface, thereby reducing overall drag of the aircraft 100. In some examples, the riblet 200 is not attached or installed on the external surface during or after manufacturing of the aircraft 100 but, rather, is integral with the external surface. For example, the riblet 200 may be pre-formed into or on the external surface (e.g., machined or molded onto a skin surface, built into a composite cured part, robotically placed or formed, etc.) instead of being coupled (e.g., mechanically adhered) to the external surface.

The example riblet 200 may contain microscopic features, which may be fragile and trap dirt and/or other foreign particles, thereby negatively affecting the overall efficiency of the aircraft 100. Reducing the height of peaks of the ridges 202 and/or maintaining a relatively flat surface of the riblet 200 in certain conditions (e.g., during certain phases of flight with corresponding typical surrounding temperatures) allows the riblet 200 to avoid potential damage and/or trapping dirt and/or foreign particles, both of which may negatively impact the aerodynamic performance of the riblet 200 and/or the aircraft 100.

Figure 3:
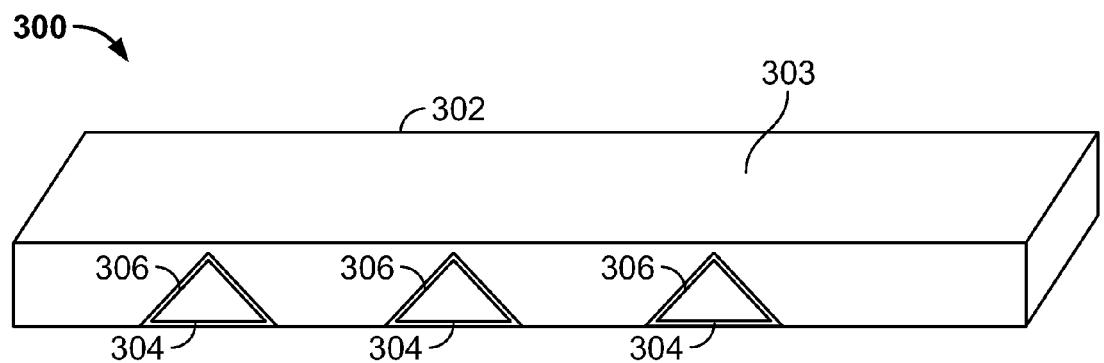
FIG. 3 is a cross-sectional view of an example thermally actuated riblet in accordance with the teachings of this disclosure.

FIG. 3 is a cross-sectional view of an example thermally actuated (e.g., displacement) riblet (e.g., riblet structure) 300 in accordance with the teachings of this disclosure. The example thermally actuated riblet 300 includes a riblet substrate 302, which is an elastomeric film in this example, that defines an external surface 303. Thermal actuation elements 304, which have thermal expansion material (e.g., a negative thermal expansion or NTE material) 306, are embedded in and/or assembled to the riblet substrate 302. In the view of FIG. 3, the thermally actuated riblet 300 is in a retracted state (e.g., an unextended state), in which the thermal actuation elements 304 lie beneath the surface 303 and/or do not extend past the surface 303.

In operation, the thermal expansion elements 304 change shape (e.g., expand) based on properties (e.g., a positive or negative thermal expansion coefficient) of the thermal expansion material 306 that causes the thermal expansion elements 304 to be in an extended (e.g., non-retracted state) based on a surrounding temperature, thereby moving/displacing at least a portion (e.g., a movable portion) of the substrate 302. In this example, the thermal expansion material 306 is a negative thermal expansion (NTE) material that expands as it reaches lower temperatures and/or contracts as it is heated. For example, as the aircraft 100 reaches cruising altitudes, the aircraft 100 may be surrounded by temperatures of approximately −50° Celsius (C). As a result, the thermal expansion material 306 expands to displace the thermal actuation elements 304 further and/or away from the surface 303, thereby transitioning the thermal actuation state to a deployed or actuated state described below in detail in connection with FIG. 4. In particular, the extension of the thermal actuation elements 304 of the illustrated example relative to the surface 303 alters dimensions (e.g., extended heights) of peaks of the thermally actuated riblet 300 to protect the riblet 300 from damage, and/or improve aerodynamic characteristics of the aircraft 100, etc. In some examples, engine bleed air and/or engine exhaust is directed towards the riblet 300 to alter dimensions of the riblet 300.

In the retracted state of FIG. 3, the thermal actuation elements 304, which define a riblet structure in the actuated state, are protected from damage and/or foreign particles, for example. In some examples, the thermal actuation elements 304 are integral with the riblet structure. In other examples, the thermal actuation elements 304 are assembled to and/or mounted to the riblet structure. The thermal actuation elements 304 also allow greater/improved control of aerodynamic properties based on temperatures (e.g., temperatures corresponding to certain flight conditions/status, etc.). For example, expansion of the thermal actuation elements 304 may be preferable during cruise, but retraction and/or height reduction of the thermal actuation elements 304 during landing, take-off and/or parking may also be preferable, for example. In other words, the thermal actuation elements 304 in combination with the substrate 302 may define a temperature-configured riblet geometries/shapes, whereby external temperatures associated with different flight statuses alter the riblet geometries/shapes.

The thermal expansion material 306 may include a silicate material, zirconium tungstate material, a cyanide-based material, or any other appropriate material. Other example expansion materials include Gallium, Germanium, Antimony and Bismuth In this example, the thermal expansion material 306 is a negative thermal expansion material that expands as heat is removed (e.g., in colder temperatures). However, in some other examples, the expansion material 306 may expand based on heat applied to the expansion material 304 (e.g., a heat actuated riblet design) and/or higher temperatures experienced by the thermal expansion material 306.

Figure 4:
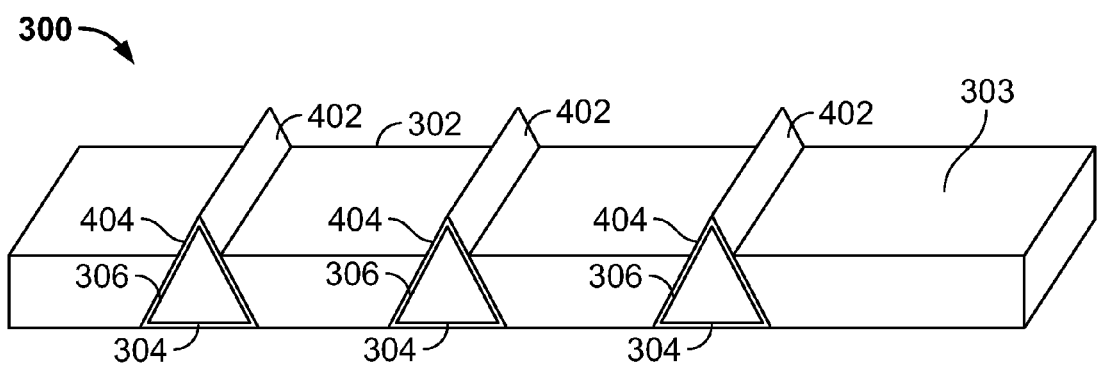
FIG. 4 is a cross-sectional view of the example thermally actuated riblet of FIG. 3.

FIG. 4 is a cross-sectional view of the example thermally actuated riblet 300 of FIG. 3 in an actuated state (e.g., an extended state). In the illustrated example of FIG. 4, the thermal expansion material 306 of the thermal actuation elements 304 has expanded, thereby defining riblet peaks 402, which define a riblet structure/pattern along with the surface 303. In some examples, the substrate 302, which may include an elastomer that has a positive coefficient of thermal expansion, may shrink as the thermally actuated riblet 300 is cooled, thereby enhancing heights of the expanding riblet peaks 402 relative to the substrate 302.

This defined riblet structure/pattern geometry alters the aerodynamic properties of the aircraft 100 by directing flow relative to the riblet peaks 402. In some examples, a degree to which different thermal expansion elements define riblet structures may be varied across different locations of the aircraft 100. In some examples, the thermal actuation elements 304 may be placed at different depths within the thermally actuated riblet 300 (e.g., at different relative positions to the surface 303) to vary a degree to which riblet structures are defined via varied extension/retraction of the thermal actuation elements 304 at various positions of the aircraft 100. Additionally or alternatively, in some examples, the thermal actuation elements 304 have different materials and/or different geometries to vary resultant shapes/patterns of riblet structures across the aircraft 100.

In this example, a portion 404 of the substrate 302 expands (e.g., elastically expands) with the thermal actuation elements 304 as they expand in response to temperature change. In particular, the substrate 302 may expand and/or deform to define a surrounding layer (e.g., uniform or non-uniform thickness) around the thermal actuation elements 304 as they expand and extend past the surface 303 based on temperature. The portion 404 may seal the thermally actuated riblet 300 and/or protect the thermal actuations elements 304 from damage and/or foreign particles as they extend past and/or further past the surface 303. In some other examples, the surface 303 is coated and/or applied with a protective layer (e.g., a sheet layer of elastomeric material, a coating, a spray-on or applied liquid coating, etc.) that may move with the thermal actuation elements 304 as the thermal actuation elements expand past the surface 303 based on surrounding temperature, for example. Additionally or alternatively, in some examples, the thermal expansion elements 304 are surrounded (e.g., individually surrounded) by a protective surrounding coating and/or layer (e.g., an applied protective layer of elastomeric material, etc.).

Figure 5:
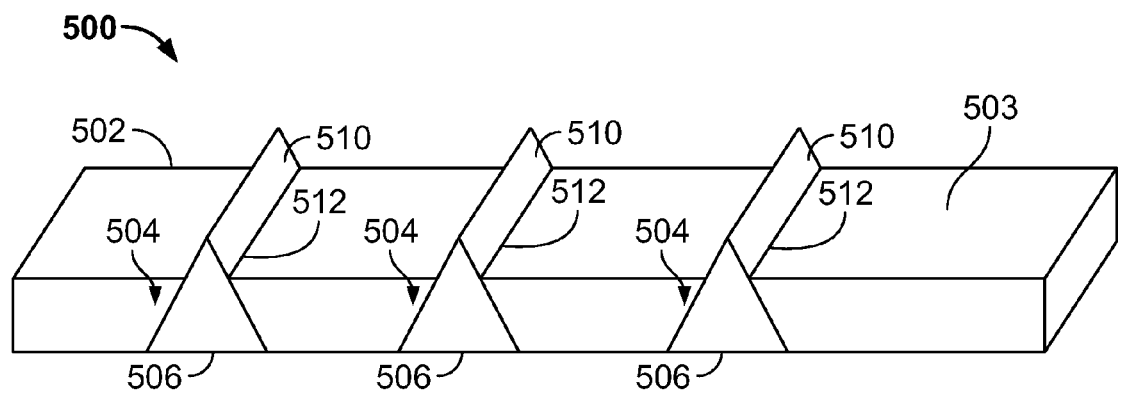
FIG. 5 is a cross-sectional view of another example thermally actuated riblet.

FIG. 5 is a cross-sectional view of another example thermally actuated riblet 500. Similar to the example thermally actuated riblet 300 of FIGS. 3 and 4, the thermally actuated riblet 500 includes a substrate 502 that defines a surface 503 and has thermal expansion elements 504 mounted/placed within. The thermal expansion elements 504 are composed of a thermal expansion material 506 and expand based on temperature to define and/or alter dimensions of riblet structures/portions 510 (e.g., alter a degree to which the thermal expansion elements 504 extend from/past valleys/base surfaces of the thermally actuated riblet 500). In this example, the thermal expansion elements 504 extend through openings (e.g., apertures, slits, etc.) 512 of the substrate 502, for example, to define and/or alter dimensions of the riblet structures 510. In other words, in this example, the thermal expansion elements 504 are exposed to external conditions as they extend past the surface 503 instead of moving (e.g., pushing) protective material (e.g., a layer) of the substrate 502 outward during expansion. In some examples, the thermal expansion elements 504 include a protective layer and/or coating to protect the thermal expansion elements 504 from exposure to external conditions.

In some examples, shapes of the thermal expansion elements 504 affect a degree to which the thermal expansion elements 504 expand based on temperature. In particular, different shapes and/or profiles may expand differently in different directions. While triangularly shaped thermal expansion elements 304, 504 are shown in FIGS. 3-5, any appropriate shape/profile (e.g., cross-sectional shape/profile, etc.) may be used to define an expansion element. The shapes that may be used include, but are not limited to, cylindrical, wedged-shaped, rectangular, circular, spherical, cone-shaped, tetrahedral, polygonal, wave-shaped, layered, etc.

Figure 6:
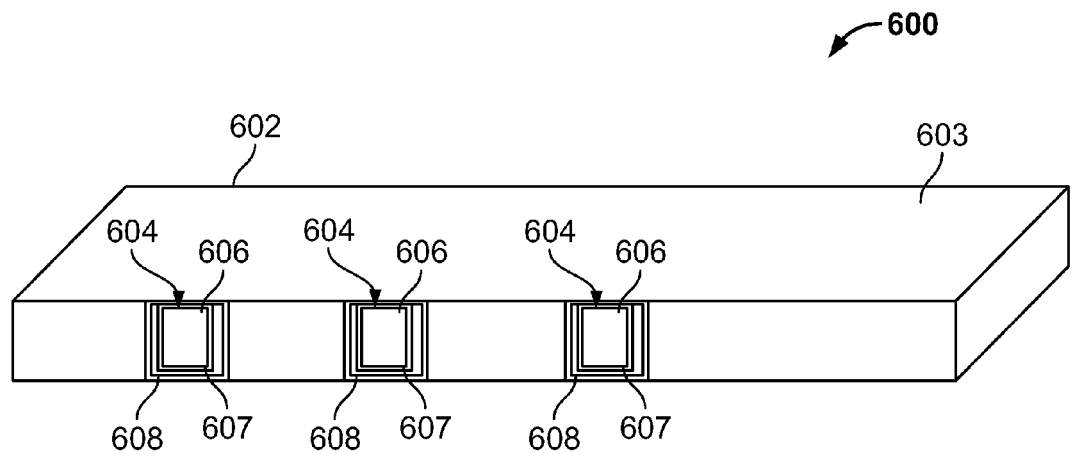
FIG. 6 is a cross-sectional view of yet another example thermally actuated riblet.

FIG. 6 is a cross-sectional view of yet another example thermally actuated riblet 600 in a retracted state. In this example, the thermally actuated riblet 600 includes a substrate 602 that defines an external surface 603 and has rectangularly shaped thermal expansion elements 604 embedded within. The example thermal expansion elements 604 include a thermal expansion material 606, which is a fluid in a liquid state (e.g., a negative thermal expansion liquid, discotic liquid crystals of nanographenes, hexa-peri-hexabenzocoronene derivatives, etc.) in this example. The liquid thermal expansion material 606 is disposed within a casing 607, which is an elastomeric film in this example. The thermal expansion elements 604 of the illustrated example are mounted/assembled within and/or placed onto channels 608 that are embedded in the substrate 602.

Figure 7:
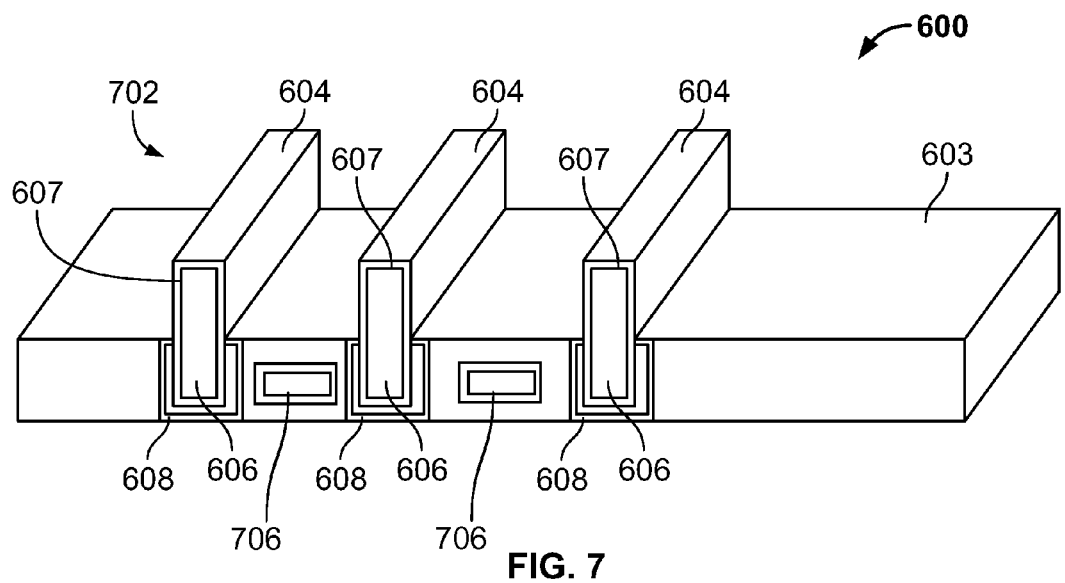
FIG. 7 is a cross-sectional view of the example thermally actuated riblet of FIG. 6.

FIG. 7 is a cross-sectional view of the example thermally actuated riblet 600 of FIG. 6 in an actuated state. In this example, the thermal expansion material 606 has expanded (e.g., due to being surrounded by air significantly below or above a pre-defined temperature value) within the casings 607 to define a riblet structure 702 having rectangularly shaped protrusions, for example. In particular, the casings 607 in conjunction with the channels 608 may define the rectangular shape of the expanded thermal expansion elements 604. In this example, the channels 608, which may be rigid, prevent expansion of the thermal expansion elements 604 in a direction opposite from the surface 603. Additionally or alternatively, in some examples, the riblet structure 702 is at least partially defined by contracting (e.g., recessing) elements 706, which are spaced apart from one another, that contract in certain temperature ranges to define valleys of the riblet structure 702. In this example, the contracting elements are a solid material with a positive coefficient of thermal expansion to decrease in size (e.g., shrink) as the contracting elements 706 are cooled (e.g., a positive thermal coefficient of expansion). In some examples, the contracting elements are filled with a fluid (e.g., a liquid) that contracts as the fluid is cooled.

Figure 8:
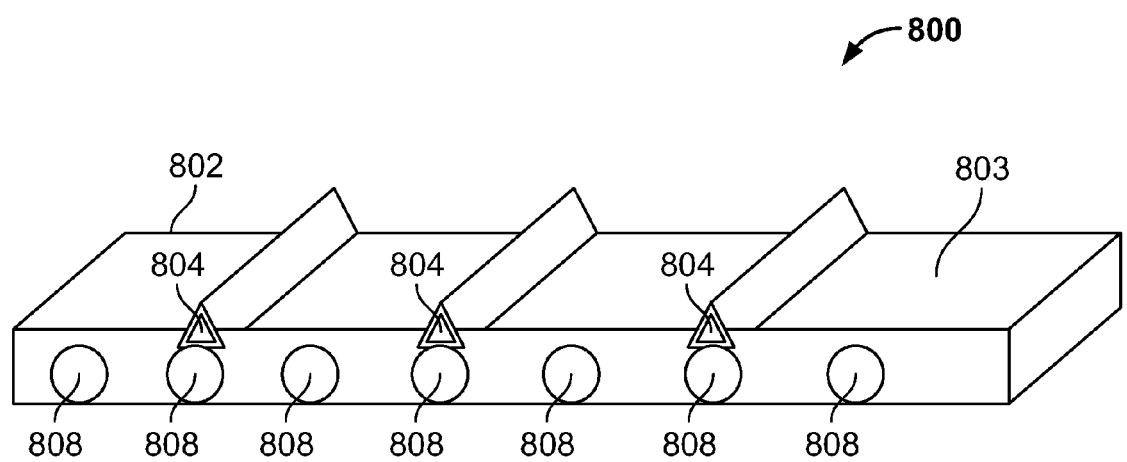
FIG. 8 is a cross-sectional view of yet another example thermally actuated riblet.

FIG. 8 is a cross-sectional view of yet another example thermally actuated riblet 800, in which shape elements are displaced to define a riblet structure. In the illustrated example of FIG. 8, the riblet thermally actuated riblet 800 includes a substrate 802 defining an external surface 803, shape elements 804, and thermal expansion elements 808, which are embedded within the substrate 802 in this example. Based on a surrounding temperature (e.g., ambient temperature), the thermal expansion elements 808 of the illustrated example expand to displace the shape elements 804 outward/away from the surface 803. In this example, the expansion elements 808 are wires/cylinders that expand radially in a generally isotropic manner, for example. In some examples, the thermal expansion elements 808 are at least partially composed of a negative thermal expansion material.

In some examples, the shape elements 804 vary in shape and/or relative position (e.g., a pitch of the shape elements 804) at different locations of an aircraft to one another. In some examples, the shape elements 804 and the thermal expansion elements 808 are separated by a portion of the substrate 802. In some examples, the at least a portion of thermal expansion elements 808 are positioned (e.g., aligned) to coincide with respective shape elements of the shape elements 804. In some examples, the shape elements 804, which may be coated with a protective layer and/or coating, extend out of and/or through apertures of the substrate 802 and are, thus, exposed to external conditions. Additionally or alternatively, the surface 803 and/or the thermally actuated riblet 800 are coated with a protective layer (e.g., an elastomeric sealing layer) and/or a sealing coat (e.g., an applied coat), for example.

Figure 9:
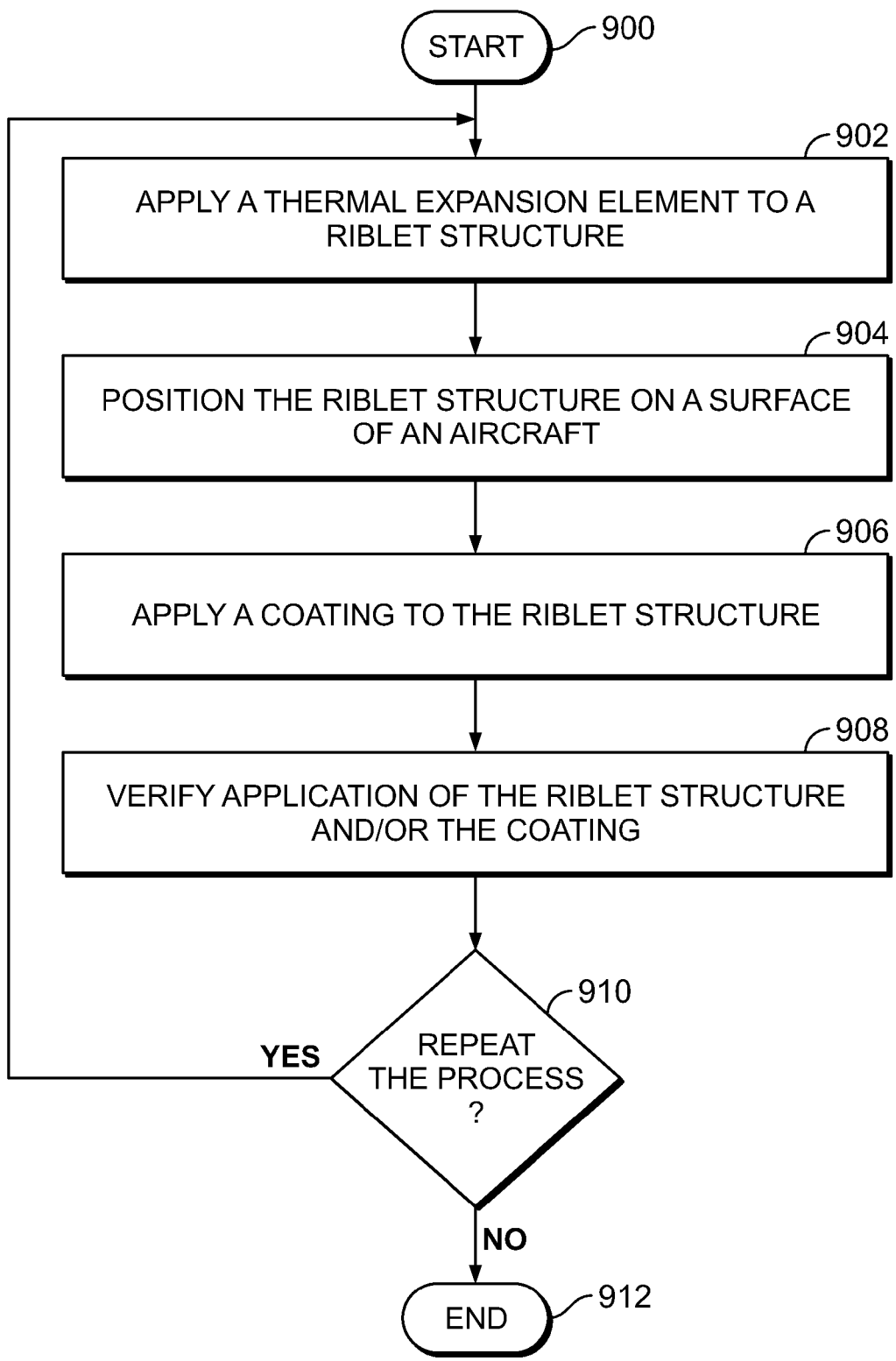
FIG. 9 is a flowchart representative of an example method that may be used to implement the examples disclosed herein.

FIG. 9 is a flowchart representative of an example method that may be used to implement the examples disclosed herein. The example method of FIG. 9 begins at block 900 where a riblet structure is to be manufactured and assembled to a vehicle (e.g., the aircraft 100) (block 900).

A thermal expansion element (e.g., the thermal expansion element 304) is applied to (e.g., embedded within, assembled within) and/or mounted to the riblet structure (block 902). In some examples, the thermal expansion element may be embedded within, molded, and/or insert molded with a substrate (e.g., the substrate 302) of the riblet structure and/or the riblet generally. In other examples, the thermal expansion element is assembled to and/or coupled to the riblet structure and displaces the entire riblet structure relative to the vehicle.

The riblet structure of the illustrated example is then positioned onto and/or assembled to the vehicle (block 904). In some examples, the riblet structure is adhered to a surface of the vehicle. In other examples, the riblet structure is integral with components that define an external surface of a vehicle. In some examples, different riblet structures (e.g., structures with varying degrees of thermal actuation and/or riblet feature pitches/distances, etc.) are assembled to different portions of a vehicle to control a degree to which aerodynamic properties are altered at different locations of the vehicle during flight (e.g., cruise) and/or different temperature ranges defined by different flight conditions, for example. In some examples, positions and/or geometric definition of the riblet structures are varied to account for thermal gradients across the vehicle, for example.

In some examples, a coating and/or protective covering is applied to the riblet structure and/or components of the riblet structure such as the thermal expansion element of the illustrated example (block 906). Alternatively, the coating and/or the protective covering is not applied and the thermal expansion element displaces (e.g., pushes) a portion (e.g., a layer) of a substrate during expansion of the thermal expansion element. In some examples, a coating and/or layer is applied to the riblet structure (block 908). In particular, the coating and/or the layer may be applied to an external surface of the riblet structure when thermal expansion elements are designed to extend through apertures of the riblet structure. Next, it is determined whether to repeat the process (block 910). If it is determined to repeat the process (block 910), control of the process returns to block 902 (block 902). If it is determined not to repeat the process (block 910), the process ends (block 912).

From the foregoing, it will be appreciated that the above disclosed methods, apparatus and articles of manufacture enable a cost-effective use of thermal expansion elements that alter/vary a shape of an aerodynamic microstructures to reduce (e.g., avoid) associated costs of maintenance and repair of the aerodynamic microstructures that can result from damage and/or contamination of foreign particles. The examples disclosed herein also enable altering shapes of aerodynamic structures based on temperature, which may coincide with certain flight conditions such as cruise, for example, without complex and/or expensive mechanical actuation devices such as electric actuators and/or gearing, for example.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the example riblet microstructures are described in connection with an aircraft, the examples disclosed herein may be applied to any other aerodynamic structure and/or vehicle.

What is claimed is:
1. An apparatus comprising:
a riblet defining an aerodynamic surface of a vehicle; and
a thermal expansion element within or operatively coupled to the riblet, wherein the thermal expansion element changes shape in response to a surrounding temperature, to displace a movable portion of the riblet relative to the aerodynamic surface to alter an aerody- namic characteristic of the vehicle, and wherein the thermal expansion element includes a negative thermal expansion material.

2. The apparatus as defined in claim 1, further including apertures of the aerodynamic surface to allow the thermal expansion element to extend therethrough.

3. The apparatus as defined in claim 1, further including a shape element to be displaced by the thermal expansion element when the thermal expansion element changes shape.

4. The apparatus as defined in claim 1, further including an elastomeric film to expand and displace with the movable portion of the riblet when the movable portion of the riblet displaces relative to the aerodynamic surface.

5. The apparatus as defined in claim 1, wherein the movable portion of the riblet is disposed beneath the aerodynamic surface and extends from the aerodynamic surface when the thermal expansion element expands.

6. The apparatus as defined in claim 1, wherein the thermal expansion element includes one or more of a silicate material, zirconium tungstate material, or a cyanide-based material.

7. The apparatus as defined in claim 1, wherein the thermal expansion element includes a negative thermal expansion liquid.

8. The apparatus as defined in claim 1, wherein the thermal expansion element includes one or more of a film or a wire.

9. An apparatus comprising:
a thermal expansion element embedded within or proximate a riblet structure, wherein the riblet structure is to define an aerodynamic surface of a vehicle, wherein the thermal expansion element expands, based on temperature, to cause one or more of a movable portion of the riblet structure or the thermal expansion element to displace away from the aerodynamic surface to alter an aerodynamic characteristic of the vehicle, and wherein the thermal expansion element includes a negative thermal expansion material.

10. The apparatus as defined in claim 9, wherein the thermal expansion element includes a fluid with expansion properties, wherein the fluid is stored in an expandable casing and expands as the fluid is cooled.

11. The apparatus as defined in claim 10, wherein the fluid includes a derivative of hexa-peri-hexabenzocoronene.

12. The apparatus as defined in claim 9, the thermal expansion element and the movable portion of the riblet structure are unitary.

13. The apparatus as defined in claim 9, wherein the thermal expansion element causes a shape element of the riblet structure to alter a geometry of the riblet structure.

14. A method comprising:
using a thermal expansion element within or proximate a riblet structure; and
allowing the thermal expansion element to displace at least a portion of the riblet structure relative to an aerodynamic surface to alter an aerodynamic characteristic of a vehicle, wherein the thermal expansion element includes a negative thermal expansion material.

15. The method as defined in claim 14, wherein the riblet structure further includes a protective layer or coating over the aerodynamic surface, wherein the thermal expansion element is to cause the protective layer to displace when the portion of the riblet structure displaces relative to the aerodynamic surface.

16. The method as defined in claim 15, wherein the protective layer includes an elastomeric film.

17. The method as defined in claim 14, wherein the thermal expansion element includes a negative thermal expansion liquid.

18. The method as defined in claim 14, wherein the thermal expansion element pushes a shape element of the riblet structure to alter a geometry of the riblet structure.

* * * * *